(12) United States Patent
Brazier

(10) Patent No.: US 8,783,795 B2
(45) Date of Patent: Jul. 22, 2014

(54) FRAMELESS TRACK ASSEMBLY

(76) Inventor: Glen Brazier, Karlstad, MN (US)

( * ) Notice: Subject to any disclaimer, the term of this patent is extended or adjusted under 35 U.S.C. 154(b) by 710 days.

(21) Appl. No.: 12/928,980

(22) Filed: Dec. 24, 2010

(65) Prior Publication Data

US 2012/0161511 A1  Jun. 28, 2012

(51) Int. Cl.
  *B62D 55/08* (2006.01)
  *B62D 55/14* (2006.01)
(52) U.S. Cl.
  CPC ............. *B62D 55/14* (2013.01); *B62D 55/08* (2013.01)
  USPC ............ 305/130; 180/9.1; 305/124; 305/136; 305/137; 305/193
(58) Field of Classification Search
  CPC .................................. B62D 55/08; B62D 55/14
  USPC .............. 305/124, 125, 129–130, 135–138, 305/142–143, 165, 178, 193, 195, 199; 180/9.1, 9.21
  See application file for complete search history.

(56) References Cited

U.S. PATENT DOCUMENTS

| | | | | |
|---|---|---|---|---|
| 1,549,594 | A * | 8/1925 | Menningen | 474/164 |
| 3,472,563 | A * | 10/1969 | Irgens | 305/112 |
| 3,880,478 | A * | 4/1975 | Baylor | 305/115 |
| 4,227,749 | A * | 10/1980 | Hesse | 305/154 |
| 4,687,261 | A * | 8/1987 | Atkin | 305/196 |
| 4,819,999 | A * | 4/1989 | Livesay et al. | 305/103 |
| 6,006,847 | A * | 12/1999 | Knight | 180/9.26 |
| 2005/0035655 | A1* | 2/2005 | Beckstrom et al. | 305/173 |
| 2009/0267407 | A1* | 10/2009 | Bessette | 305/135 |
| 2010/0012399 | A1* | 1/2010 | Hansen | 180/9.26 |
| 2011/0101135 | A1* | 5/2011 | Korus et al. | 239/723 |
| 2011/0121643 | A1* | 5/2011 | Mulligan | 305/136 |

* cited by examiner

*Primary Examiner* — James English
(74) *Attorney, Agent, or Firm* — DL Tschida

(57) ABSTRACT

A track assembly comprising an endless track trained about a sprocket and forward and aft sets of idler wheels. A plurality of apertures at the sprocket engage drive lugs that project from an interior track surface. Longitudinal stabilizer arms restrain the idler wheel axles, idler wheels, sprocket support rollers, sprocket and track against lateral movement and tension the track. Overlapping seals are formed at the idler wheels and/or sprocket support rollers. Alternative sprockets having cutouts or pockets that capture different drive lug configurations are also disclosed along with several alternative track tensioning assemblies that rotate in an eccentric fashion to tension the track.

17 Claims, 12 Drawing Sheets

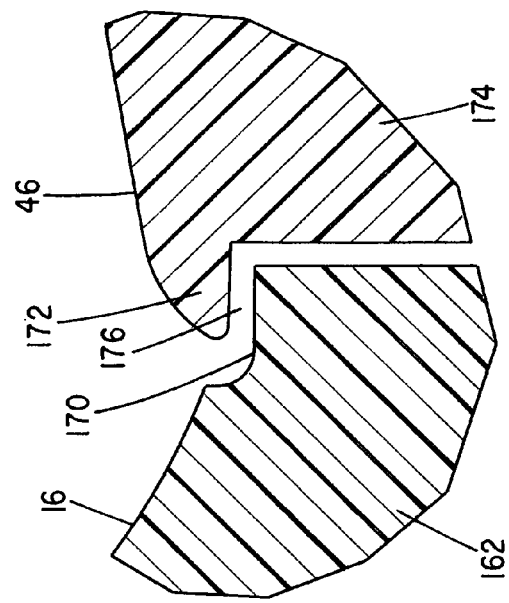
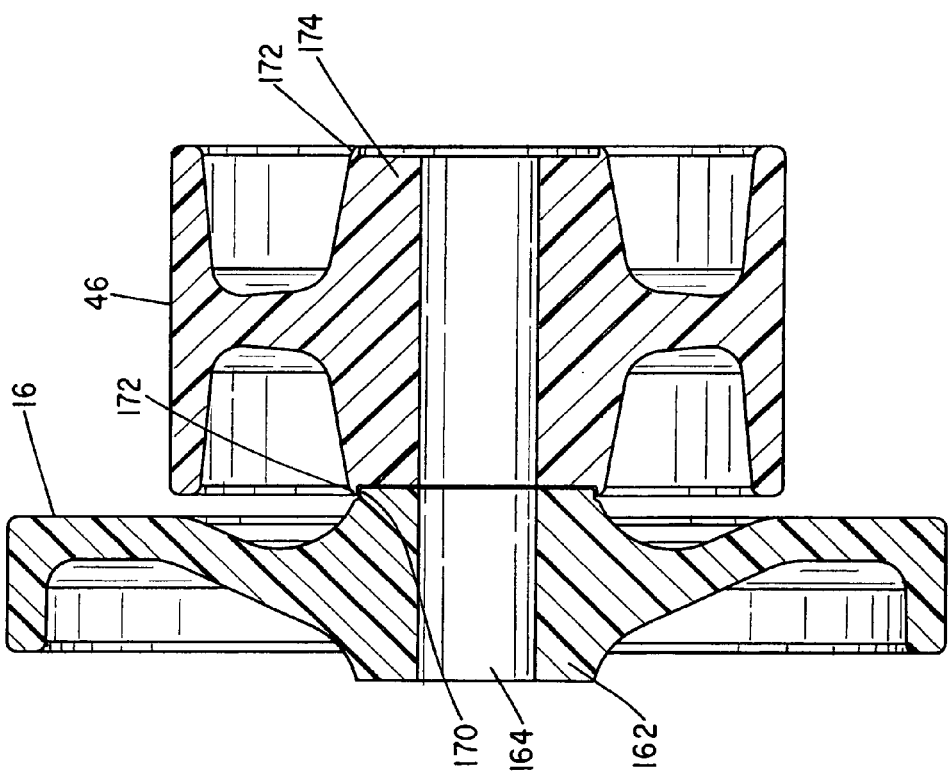
FIG. 13
FIG. 12

FRAMELESS TRACK ASSEMBLY

BACKGROUND OF THE INVENTION

The present invention relates to a track support assembly for motorized equipment and, in particular, to an endless track assembly particularly adapted to support snow blowers and other light weight equipment.

A wide variety of engine powered equipment has been developed for performing a variety of home and commercial tasks, for example, snow blowers, plows, grass cutters, sweepers, trenchers, bucket-type diggers, stump grinders, among other equipment types. The chassis and frameworks of such equipment are typically supported on wheels mounted with pneumatic tires. The terrain where the equipment is used however is not always accommodating of movement of the wheels through mud, snow and over other rough terrain. Many of these units also include self-drive linkages.

The present invention was developed to provide an economical, self-supporting and substantially frame-less track assembly for such equipment and especially self-driven equipment. The equipment may support an operator or be hand-directed by an operator. An on-board gas, electric or other suitable engine that powers a work head piece or assembly that performs a desired function, as well as driving equipment movement. A present application is a gas powered snow blower wherein a driven auger aggregates and directs snow from a discharge chute as the subject track assembly supports and powers the equipment forward and backward.

The track assembly is configured to couple a drive sprocket to the equipment engine either directly or through a gear system, transmission or other appropriate drive linkage. Apertures, grooves, slots or other appendages at the drive sprocket engage depressions or drive lugs that depend from a circumscribing drive track trained to rotate in endless fashion about the sprocket.

Idler and/or bogey wheels supported from idler axles are laterally displaced to the sides of the drive sprocket at forward and/or aft ends of the track to stabilize the sprocket and maintain track ground contact. The lateral sides of the drive sprocket contact and are supported by the idler wheels. Rollers supported intermediate the idlers wheels from the idler axles contact and support circumferential surfaces of the drive sprocket to further stabilize the sprocket. Linkage arms extending between the idler axles provide additional lateral support to the idler wheels, sprocket and drive lugs. The sprocket and idler wheels collectively maintain track tension and prevent slippage or dislodgement of the track from the idler wheels and/or sprocket.

The assembly is also constructed to minimize snow and ice build-up within interior spaces of the sprocket and track assembly to further prevent slippage or dislodgement of the track. Seals are also integrated into the idler wheels and/or sprocket support rollers to interact and cooperate to enhance operation and equipment life.

SUMMARY OF THE INVENTION

It is a primary object of the invention to provide an economical, self-supporting and substantially frameless track assembly for power equipment It is further object of the invention to provide an endless track assembly that can be mounted to equipment that supports an operator or is hand-directed by an operator to position an equipment work head piece or assembly to perform a work function over relatively rough terrain.

It is further object of the invention to couple a sprocket to the equipment engine to drive a track circumscribing the sprocket and several idler and/or bogey wheels to rotate the track in endless fashion and drive the equipment forward and backward.

It is a further object of the invention to mount rollers to support the sprocket to prevent slippage or dislodgement of the sprocket from the track and/or from contact with the idler wheels.

It is a further object of the invention to provide idler wheels that include integrated seals that cooperate with sprocket support rollers and/or the sprocket to prevent the collection of abrasive materials at overlapping rotating surfaces.

It is a further object of the invention to provide idler wheels that contain and support the sprocket in tensioned contact with the track to prevent slippage or dislodgement of the track from the idler wheels and/or sprocket.

It is a further object of the invention to provide a stabilizer linkage that couples to and/or extends between axles that support idler wheels and/or sprocket support rollers to stabilize the idler wheels and/or sprocket and/or drive lugs depending from a drive track surface against lateral movement and dislodgement of the track.

It is a further object of the invention to provide a slotted or length adjustable axle stabilizer linkage that interacts with the idler wheels to vary track tension.

It is a further object of the invention to provide at least one sprocket support roller having an outer surface mounted to rotate in an eccentric or cam-like fashion relative to a supporting idler axle such that the support roller can be rotated to vary the tension of the track about the drive sprocket and idler wheels.

It is a further object of the invention to provide track assemblies with drive sprockets having recessed pockets or notches aligned to couple with depending drive teeth of a surrounding drive track.

The foregoing objects, advantages and distinctions of the invention are obtained in a track assembly adapted for use with a variety of power equipment, for example a snow blower, to drive the equipment over snow and ice. In one construction, the assembly comprises a track trained about a sprocket and forward and aft end idler or "bogie" wheels supported from idler axles. The idler axles extend between left and right longitudinal stabilizer linkage arms. Rollers are independently mounted to each idler axle to contact and support the sprocket and distribute equipment weight to the track.

The longitudinal stabilizer linkage arms mount to the lateral sides of the track assembly and extend between the idler axles to stabilize the idler wheels, rollers, sprocket and track against lateral movement. Portions of the linkage arms also contact drive lugs that depend from the drive track to further stabilize the idler wheels, sprocket and track against dislodgement. The linkage arms can include an elongated axle support bore or can be constructed to be length adjustable to permit the adjustment of track tension relative to the sprocket and idler wheels.

The track drive sprocket in various disclosed embodiments includes a plurality of apertures, slots or depressions that engage drive lugs that project or depend from an interior track surface. Longitudinal channels are defined at the interior track surface and/or relative to the drive lugs or other depending projections or depressions at the interior spaces of the track assembly to cooperate with the stabilizer linkages and prevent track dislodgement. The drive sprocket may also include recessed cavities, notches or slots that cooperate with the drive lugs.

An alternative track tensioning assembly is also disclosed that comprises a sprocket support roller having an off-center axle bore. An idler axle keyed to a fasteners fashioned to mate at multiple positions at the stabilizer linkages is mounted to rotate the support roller relative to a stabilizer linkage arms in an eccentric fashion to displace the roller and sprocket to vary the tension between the sprocket and track. Upon securing the axle fasteners and ends of the idler axle to available locking positions, the selected track tension is sustained.

One or both support rollers can be mounted to rotate in a similar eccentric fashion. Similarly one or both end pairs of idler wheels might have off-center axle bores and be mounted to rotate in an eccentric fashion to displace the track and vary track tension. Similarly, the sprocket can be mounted to an axle bearing piece that is positioned off-center to the sprocket and coupled to the equipment to adjustably rotate the sprocket in an eccentric manner to vary the track tension.

A variety of alternative sprocket configurations are disclosed that interact with the track, sprocket support rollers and idler wheels. Idler wheels with alternative integrated resilient seals and overlapping seal surfaces that interact with the sprocket support rollers are also disclosed.

Still other objects, advantages, distinctions, constructions and combinations of individual features of the invention will become more apparent from the following description with respect to the appended drawings. Similar components and assemblies are referred to in the various drawings with similar alphanumeric reference characters. The description to each combination should therefore not be literally construed in limitation of the invention. It is also to be appreciated the singular improvements can be combined in any variety of track assemblies. The invention should therefore be interpreted within the broad scope of the further appended claims.

BRIEF DESCRIPTION OF THE DRAWINGS

FIG. 12 shows a cross section view through one of the sprocket support rollers and adjacent idler wheel in the region of overlapping contact between a projecting seal at the roller and mating recess at the hub of the idler wheel.

FIG. 13 shows an enlarged cross section view through the sprocket support roller and idler wheel in the region of contact between the sprocket support roller and idler wheel to expose the sealed joint between the idler wheel hub and support roller.

DESCRIPTION OF THE PREFERRED EMBODIMENTS

Figure 1:
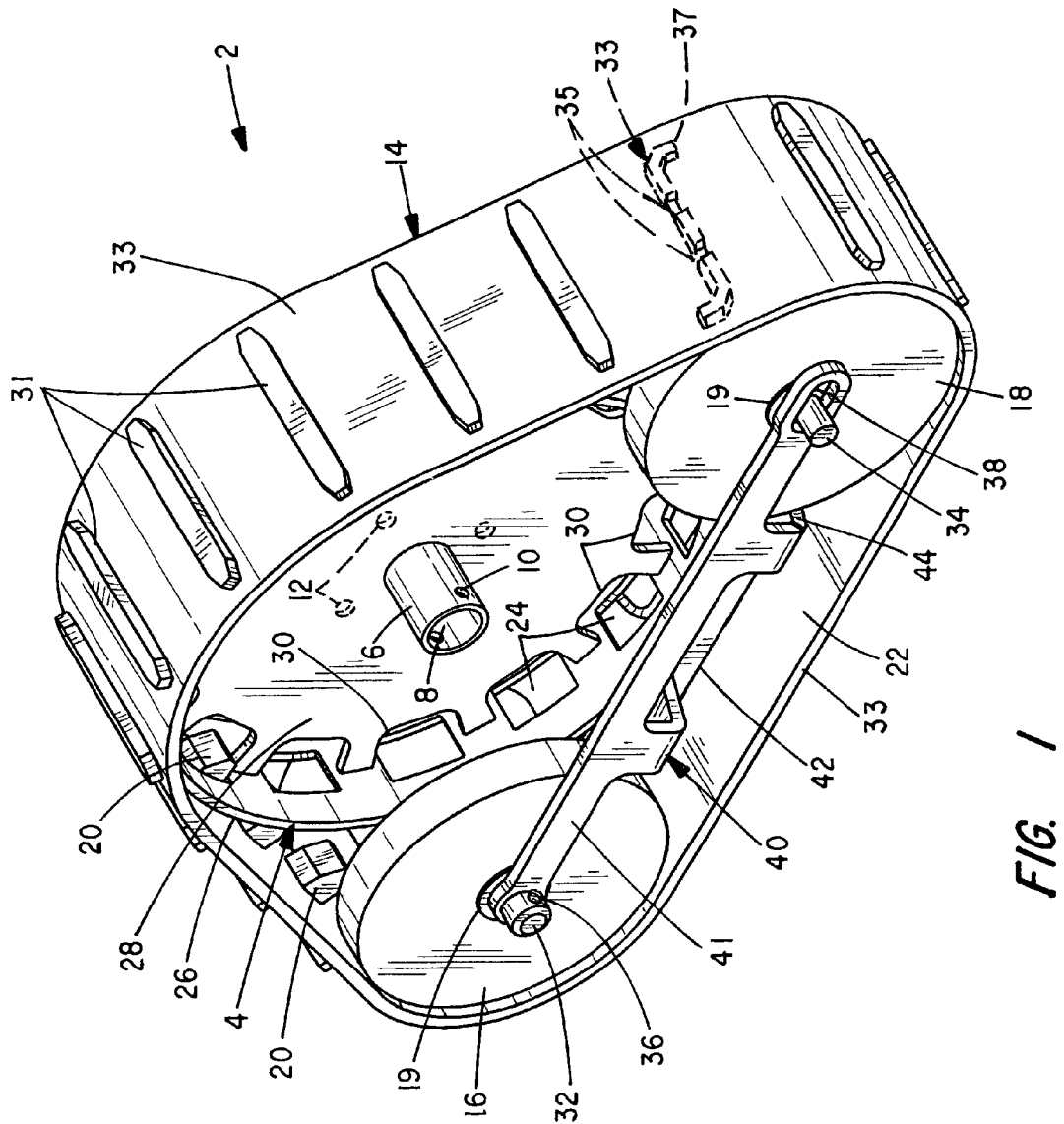
FIG. 1 shows a perspective view to one construction of a frameless drive track assembly of the invention.
Figure 2:
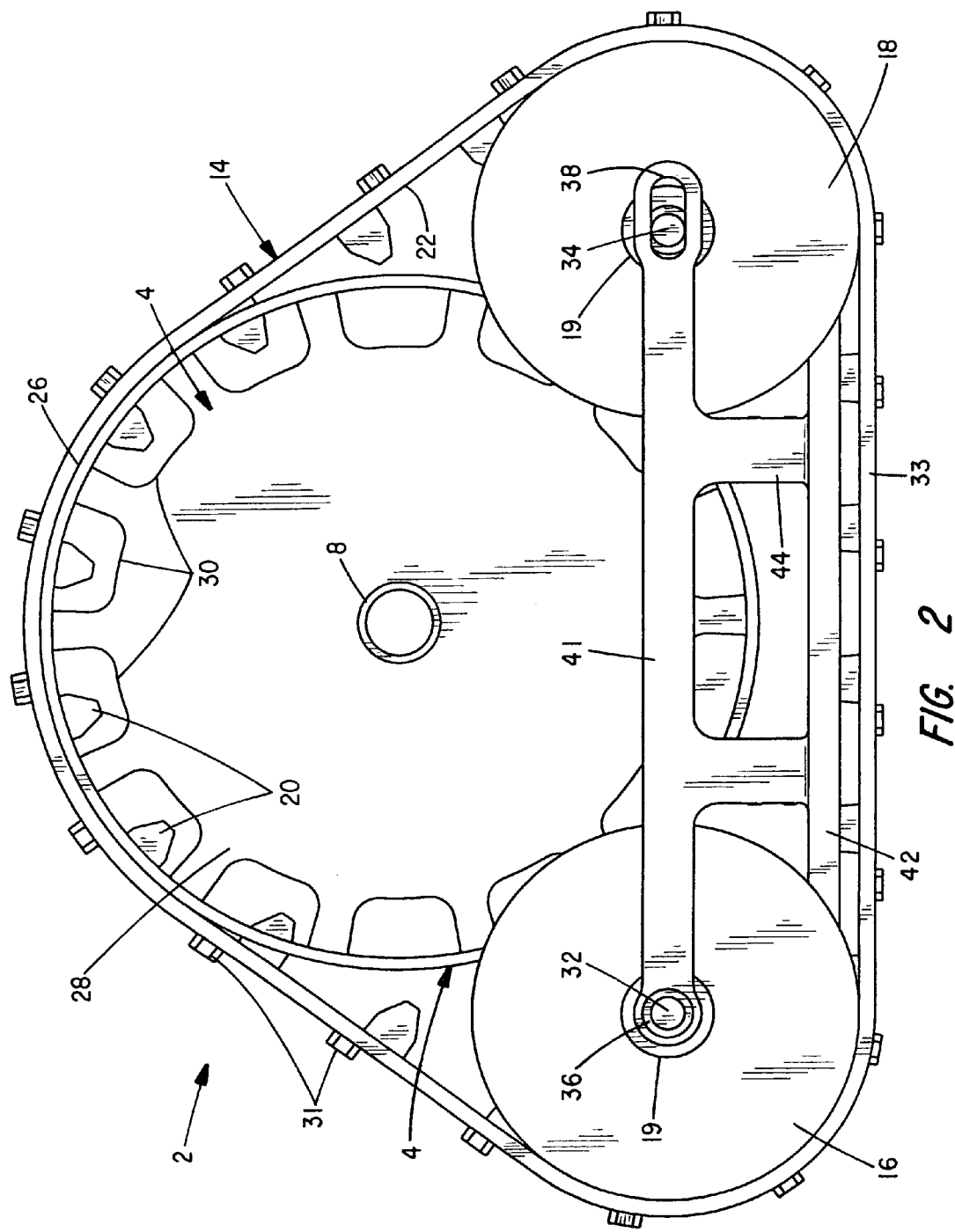
FIG. 2 shows a front plan view to the frameless drive track assembly of FIG. 1 and wherein the rear plan view is substantially identical.
Figure 3:
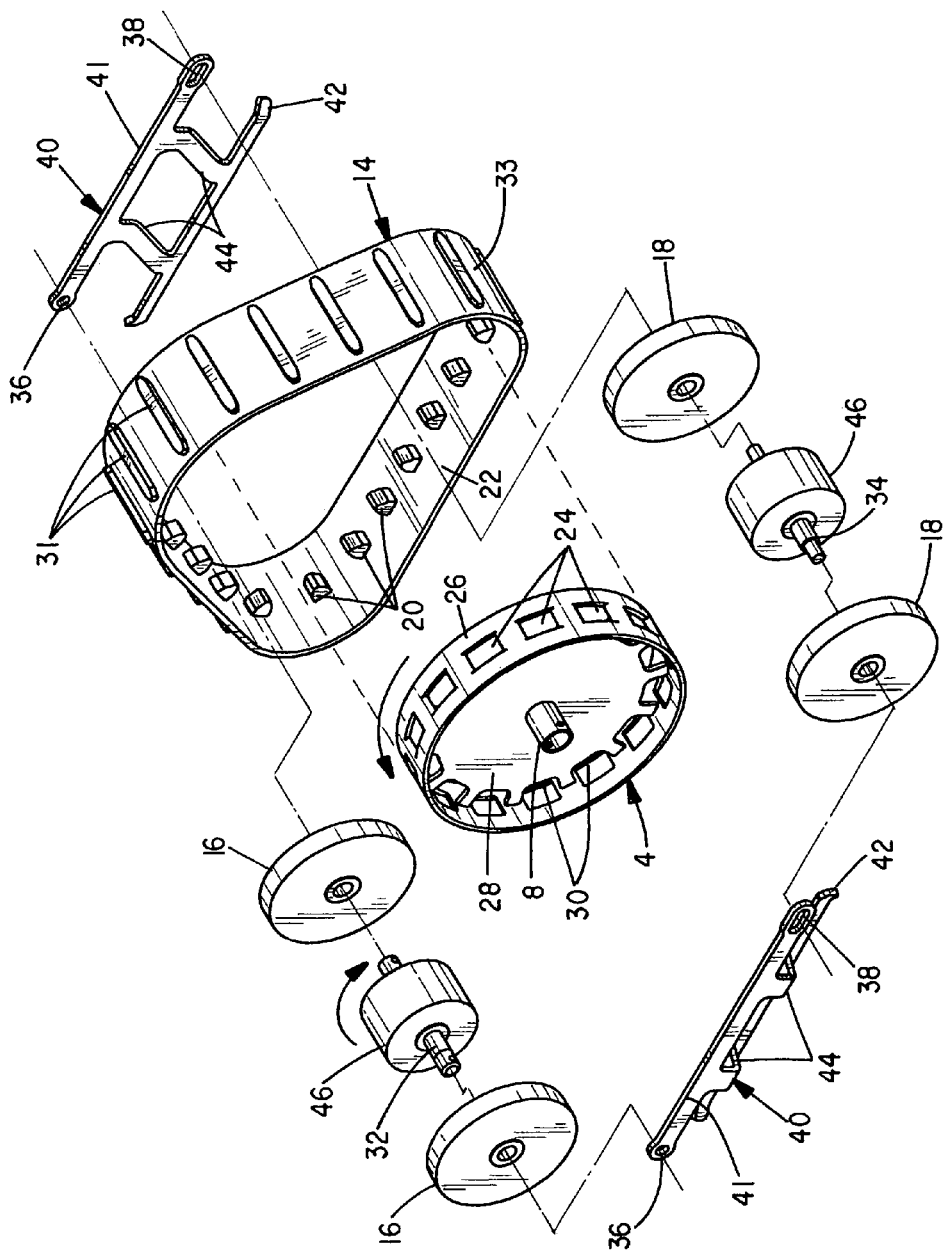
FIG. 3 shows a perspective view in exploded assembly to the frameless drive track assembly of FIG. 1.

With attention to the perspective view of FIG. 1, an improved frameless track assembly 2 of the invention is shown. The assembly 2 finds utility with a variety of passive and self-driven power equipment for commercial, contractor and home use, such as snow blowers, lawn equipment, trenchers, bucket-type diggers etc. Multiple track assemblies 2 are typically mounted to support the equipment alone or in combination with wheels or other supports.

A sprocket 4 of the assembly 2 is adapted to rotate and couple to a passive (i.e. un-powered) axle, driven axle or power takeoff (PTO) device or linkage (not shown) provided at the equipment. A hub 6 having a central bore 8 and transverse fastener holes 10 projects from the sprocket 4 and receives an axle or a power driven shaft (not shown).

The driven shaft is commonly coupled to an equipment engine via a geared transmission, belt system, hydrostatic coupler or other suitable power transfer linkage. The holes 10 align with mating holes at the axle and support a fastener such as a split pin, cotter pin or other suitable fastener. The hub 6 might also include a keyway slot that aligns with a slot in the driven shaft to accept a key piece and secure the track assembly 2 to the equipment. The sprocket 4 might also provide holes 12 (shown in dashed line) that mate with a backing plate fitted to the equipment's driven shaft (not shown) and secured with stud bolts that project from the plate and mount to the patterned holes 12 at the drive sprocket 4.

Power transferred from the equipment engine to the assembly 2 or towing or manual pushing of the equipment rotates the sprocket 4. The sprocket 4 is coupled to a drive track 14 that is trained to rotate in endless fashion about the sprocket 4 and paired sets of forward and aft idler wheels 16 and 18. The idler wheels 16 and 18 can include center axle bearings or bushings 19 and washers. Depending upon the application and material used to form the idler wheels 16 and 18, bearings 19 may not be required.

Figure 8:
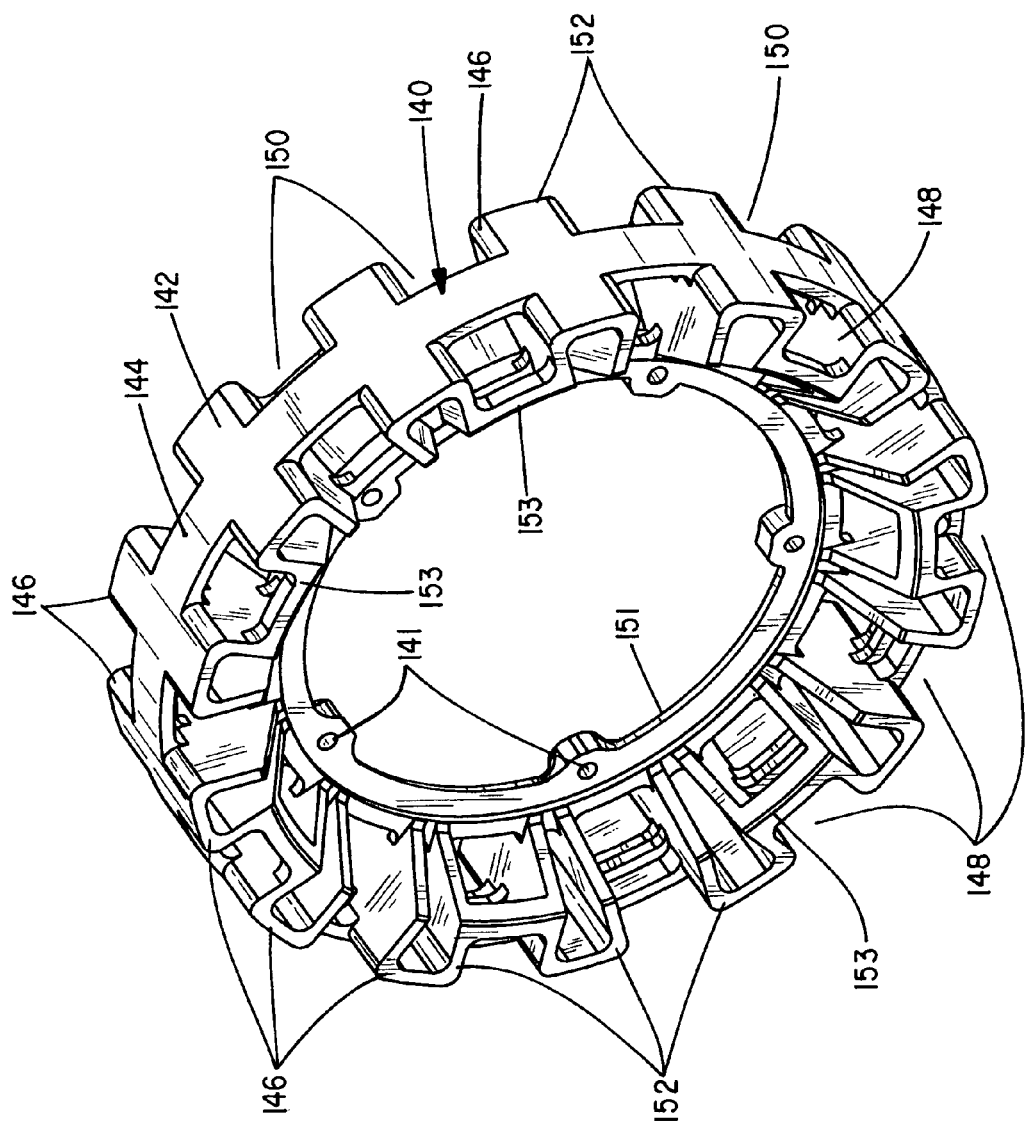
FIG. 8 shows a perspective view to a molded sprocket ring, sans an equipment supported drive plate, adapted to engage laterally displaced rows of drive lugs that depend from the track and rotate in constrained contact between the idler wheels.

Drive lugs 20 extend from an interior surface 22 of the track 14 and cooperate with drive apertures 24 let through a cylindrical ring piece 26 that circumscribes the sprocket 4. The ring piece 26 is fastened to a center support or spoke plate 28 having cutouts 30 that span each aperture 24. The cutouts 30 are sufficiently recessed to prevent contact between the spoke plate 28 and drive lugs 20. The spoke plate 28 can also be constructed to detach from the ring piece 26 and an example of which is shown at FIG. 8.

Suitably shaped and arrayed ground lugs 31 project from an exterior surface 33 of the track 14. The ground lugs 31 are depicted in a generalized form. The ground lugs 31 used with any particular equipment however are constructed to optimally grip the supporting terrain and can exhibit a variety of alternative shapes, sizes, arrangements, and patterns to appropriately grip snow, soil, rocks etc. at the terrain. One presently preferred ground lug 33 adapted for use with a snow blower having recesses 35 and hooked ends 37 is shown in dashed line. It is to be appreciated lugs 31 of the same or a variety of differing shapes can be used with any track 14.

The forward and aft sets of idler wheels 16 and 18 are mounted to forward and aft idler axles 32 and 34. The idler axles 32 and 34, in turn, are mounted to bores 36 and 38 at left and right stabilizer linkage arms 40. The linkage arms 40 longitudinally extend along the left and right sides of the track assembly 2. Threaded fasteners and washers or other suitable fasteners (not shown) mount to the ends of the axles 32 and 34 and retain the axles 32 and 34 to the linkage arms 40. The sprocket 4 and idler wheels 16 and 18 are retained between the linkage arms 40 and the idler wheels 16 and 18 stabilize the sprocket 4.

Elongated bores 38 are provided at one or both ends of the linkage arms 40 and provide a range of movement for the axle 34 relative to the fasteners. The slotted bores 38 permit an adjustment of the tension of the track 14 relative to the sprocket 4 and idler wheels 16 and 18

Appropriate tension is established with the judicious application of a tool between for example the axles 34 and other suitable fulcrum surface at the idler wheels 18 or the stabilizer link piece or rail 41. With the levering of the tool, the axle 34 position and tension of the track 14 is established before securing the selected axle position with appropriate fasteners. The bores 36 may also be elongated to provide additional tensioning adjustment. Alternative eccentric adjusters are described below which might also be applied to facilitate tensioning of the track 14 relative to the drive sprocket 4 and idler wheels 16 and 18. In certain applications, a tension adjusting mechanism may not be required.

The stabilizer linkage arms 40 longitudinally extend along the sides of the assembly 2 and include the tensioning rail 41 and offset slide rails 42. The slide rails 42 are laterally offset to overly the interior track surface 22 adjacent the drive lugs 20 and depend below the rails 41 via transverse arms 44. The slide rails 42 are formed and positioned to contact and laterally stabilize the drive lugs 20.

The slide rails 42 can also contact the interior surface 22 of the track 4 without obstructing movement of the idler wheels 16, 18 or sprocket 4. In this instance the rails 41 also stabilize the ground engaging surface portion of the track 14. Suitable coatings can be applied to the rails 42 and/or the contacted portion of the track surface 22 to prevent abrading the track 14.

Figure 4:
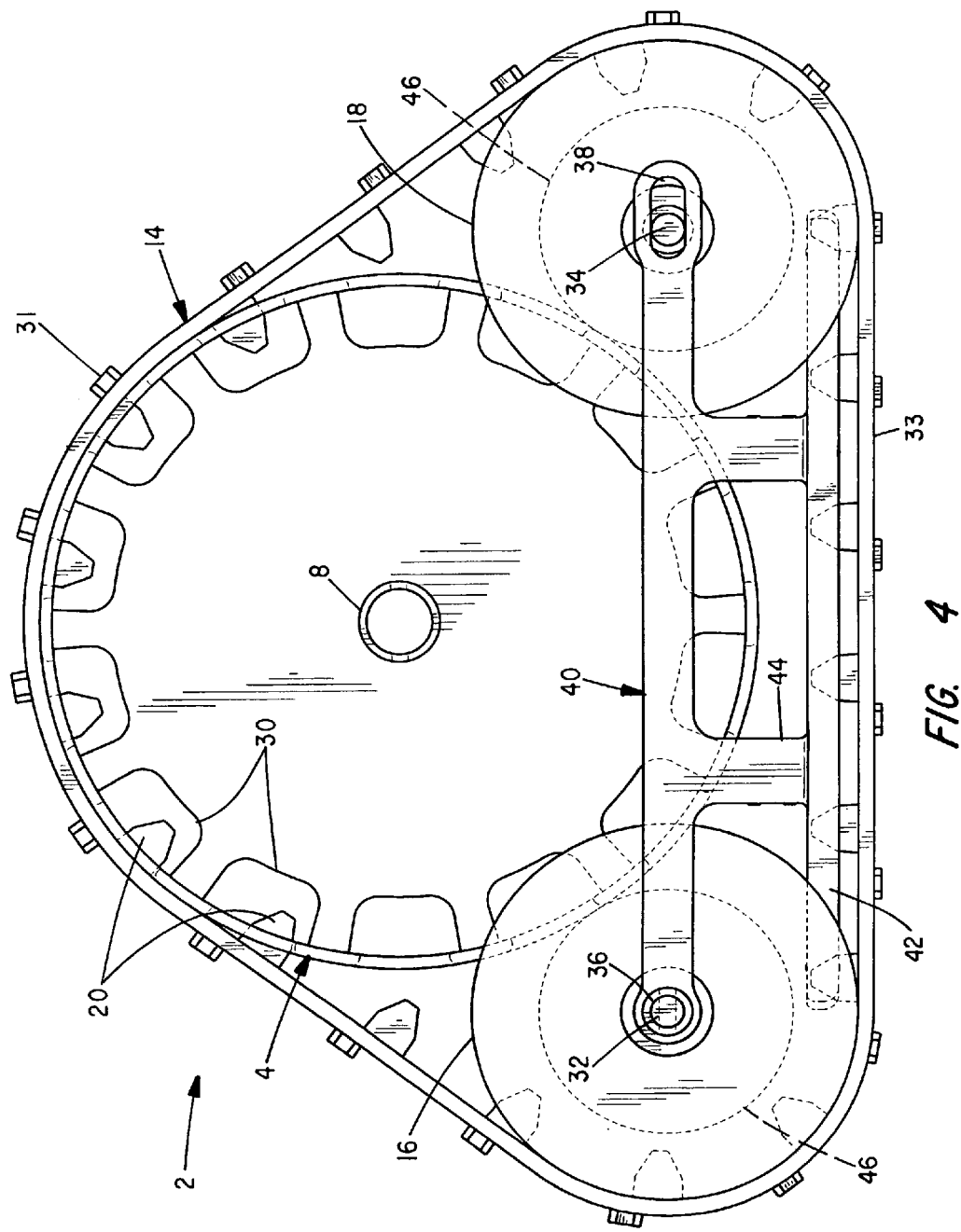
FIG. 4 shows a front plan view to the frameless drive track assembly of FIG. 1 and wherein the cooperation of drive sprocket support rollers with the drive sprocket are shown in dashed line.

Also mounted to the idler axles 32 and 34 intermediate the idler wheels 16 and 18 are sprocket support rollers 46. The rollers 46 are sized and positioned to support the sprocket drive ring 26 without interfering with the rotation of the drive lugs 20, see FIG. 4. The support rollers 46 are displaced away from the drive lugs 20 and only contact the ring 26. The rollers 46 thus stabilize the ring 26 and sprocket 4 and facilitate the distribution of the equipment weight to the track 14. The equipment weight is further distributed via the axles 32 and 34 to the ground engaging surface 33 of the track 14. The rollers 46 normally rotate opposite to the sprocket 4 as noted with the directional arrows. Although the track assembly 2 utilizes stabilizer linkage arms 40 and support rollers 46, it is to be appreciated that depending upon the application either might be used alone without the other to stabilize the track 14.

Figure 5:
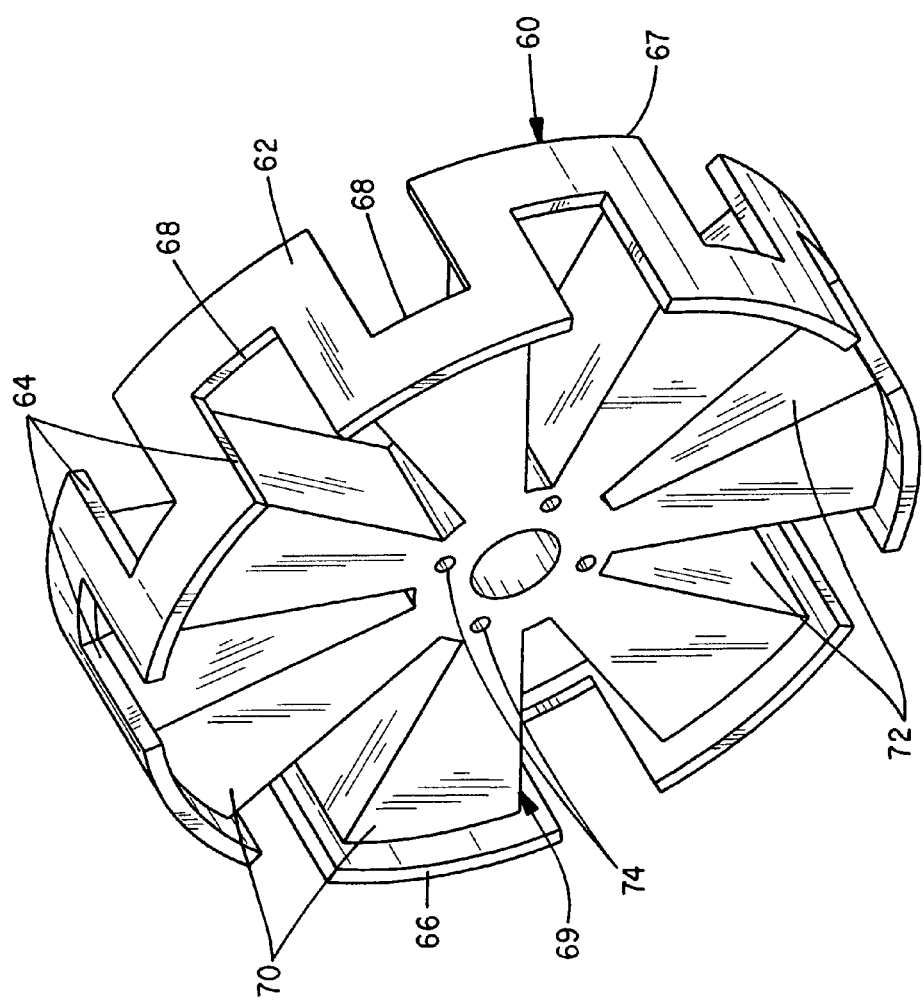
FIG. 5 shows a perspective view to an alternative drive sprocket having lateral notches aligned to couple to the drive lugs and retain the track to the drive sprocket.
Figure 6:
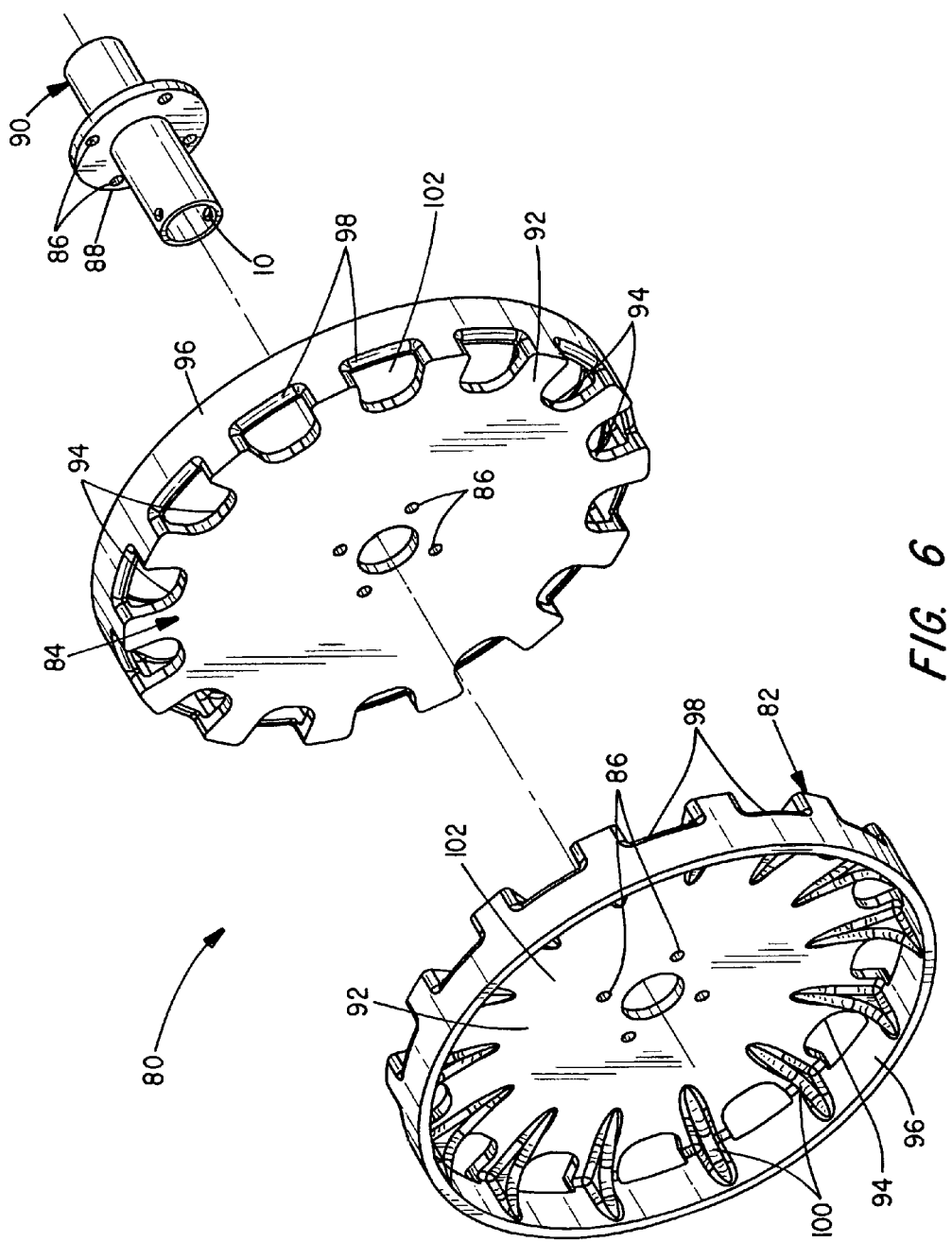
FIG. 6 shows a perspective view to left and right halves of a split drive sprocket that fasten together and to a removable hub.

FIGS. 5 and 6 depict alternative drive sprockets 60 and 80 that can be adapted to the track assembly 2. The sprocket 60 is constructed to provide a drive ring 62 having lateral cutouts or notches 64 that extend inward from left and right lateral edges 66 and 67. The cutouts 64 along the edge 66 are circumferentially offset from the cutouts 64 that extend from the edge 67. A zigzag pattern is thus displayed by the cutouts 64 at the ring 62. The cutouts 64 are sized and arranged to mate with the track drive lugs 20.

The alternating lateral displacement of the cutouts 64 assures that the drive lugs 20 are captured to the sprocket 60 to prevent lateral movement of the track 14. At least two cutouts 64 are always in contact with the lugs 20. This assures that the opposite lateral sides of at least two seriatim lugs 20 are at all times captured by the cutouts 64. Stated differently, the recessed interior edges 68 of at least two adjacent cutouts 64 essentially define the opposite sides of an open-sided aperture and retain the track 4 to the sprocket 60 as it is being driven.

A suitably shaped spoke plate 69 is secured to the drive ring 62 and provides radially directed spokes 70. Pockets or recesses 72 are provided adjacent the cutouts 64 of sufficient depth to accommodate the height of the drive lugs 20. Mounting holes 74 are provided to fasten to a backing plate or other hub assembly (not shown) to secure the sprocket 60 to a driven shaft of the powered equipment.

FIG. 6 depicts a perspective view to the alternative drive sprocket 80 shown in exploded assembly. The sprocket 80 provides mating cupped or bowl-like half plates 82 and 84 which align at included apertures 86. The half plates 82 and 84 fasten to similarly arranged apertures 86 at an annular flange 88 of a cylindrical hub piece 90. The plates 82 and 84 are generally symmetrically configured to each provide a number of generally flat, spokes or disk pieces 92. Notched or cutout regions 94 are formed between the spokes 92 and radially extend inward toward a central region of the plates 82 and 84.

A ring rim or band piece 96 projects laterally from the disk pieces 92 and includes notched cutout regions 98 that generally align orthogonally with the notches 94. Gussets, weld beads or other suitable stabilizers 100 support the band pieces 96 to the disk pieces 92 to stabilize the disk and band pieces 92 and 96. The gussets 100 are located in a circumscribed cavity space 102. The plates 82 and 84 might also be molded as single units.

Upon securing the plates 82 and 84 together and to the hub piece 90, the orthogonally aligned notches 94 and 98 define recessed apertures or pockets that circumscribe the sprocket 80 and receive the drive lugs 20. The cutouts 94 are recessed sufficiently to accommodate the height of the drive lugs 20

Figure 7:
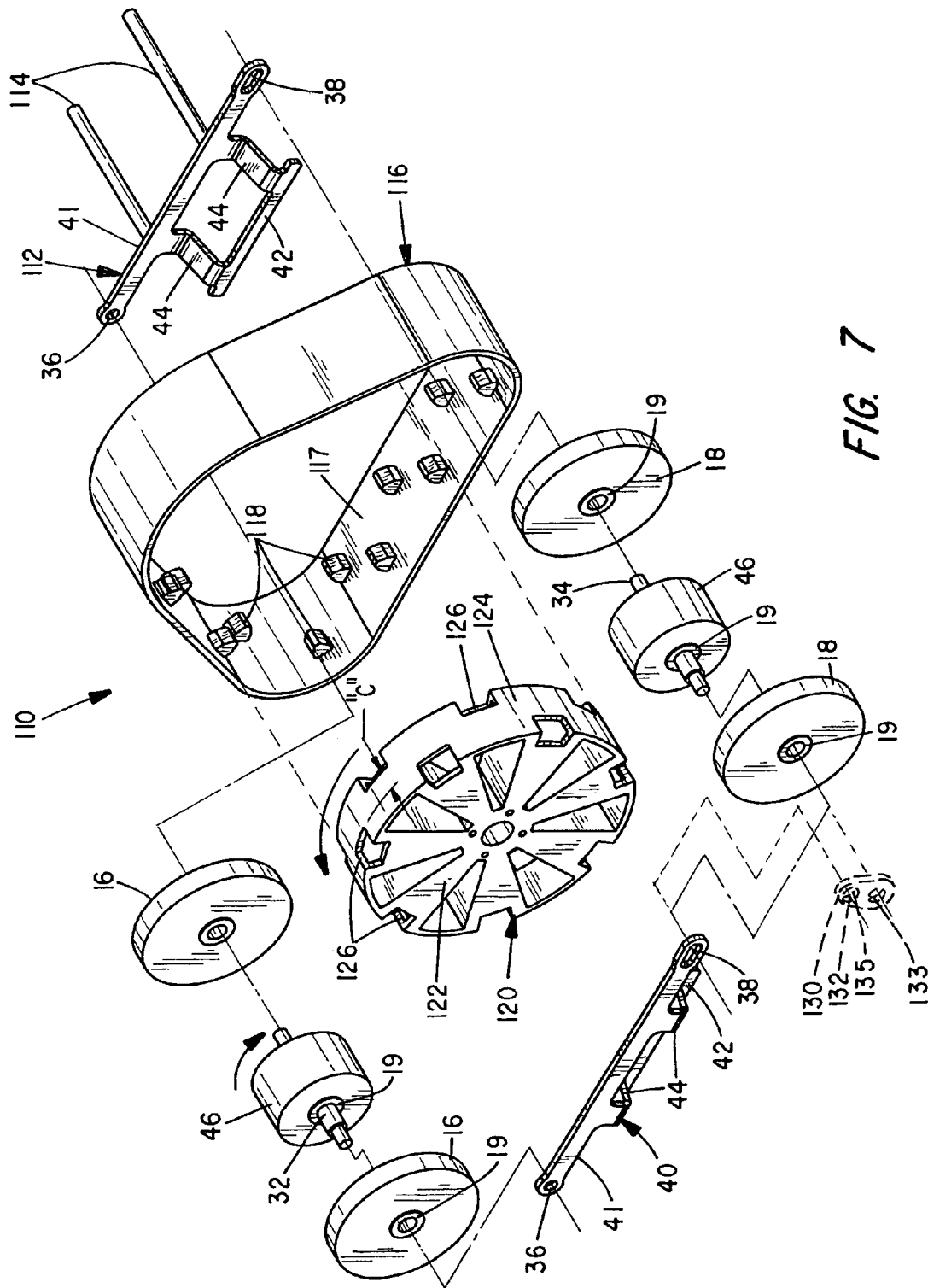
FIG. 7 shows a perspective view in exploded assembly of a drive sprocket having radially offset drive notches on opposed sides of the sprocket that engage left and right rows of longitudinally offset drive lugs that depend from the track. Off-center roller bearing and stabilizer linkage fastener mounting are also shown that enable an eccentric rotational tensioning of the sprocket support roller and/or axial adjustment of the idler wheel axle to vary track tension.

FIG. 7 depicts an exploded assembly to another alternative frameless track drive assembly 110. The assembly 110 includes idler wheels 16 and 18 and sprocket support rollers 46 mounted to idler axles 32 and 34. The idler axles 32 and 34 are supported to longitudinal stabilizer linkage arms 40. A pair of equipment linkage coupling arms 114 project from the inner rail 41. The arms 114 mate or cooperate with interconnecting resilient couplers or linkages at the powered equipment. The arms 114 act as anti-rotation stops or limits to control any rotation of the track assembly 110 relative to the powered equipment. The resilient linkage can for example comprise elastomer members, rubber bumpers, rigid or compliant surfaces, or a hydraulic or pneumatic assembly. The arms 114 can accommodate either a passive (i.e. non-driven sprocket) or an active (i.e. driven sprocket) coupling of the drive assembly 110 to the equipment.

A drive track 116 depicted for convenience without ground engaging lugs includes two laterally offset longitudinal lines of drive lugs 118. A longitudinal channel 117 is defined in the space between the columns of drive lugs 118. The drive lugs 118 along the left and right sides are longitudinally displaced or staggered from the adjoining column of drive lugs 118. The longitudinally staggered columns of drive lugs 118 are organized to minimize snow build-up inside the track 116 and minimize the chance of dislodging the drive sprocket 120 that mates with the lines of drive lugs 118.

The sprocket 120 comprises a hybrid of the sprocket 60 of FIG. 5. The sprocket 120 includes a spoke and hub portion 122 and a circumscribing ring or band portion 124. A series of recessed cutouts or pockets 126 are formed at the peripheral circumferential edges of the ring portion 124. The cutouts 126 at the left and right circumferential edges of the ring 124 are radially staggered an appropriate arcuate distance to capture the longitudinally staggered drive lugs 118. Multiple left and right drive lugs 118 are thus in contact at all times with the sprocket 120 and retain the sprocket 120 to the track 116. The construction of the sprocket 120 and arrangement of the center region "C" of the ring 124 also assures that the center region "C" is always in contact with the channel or interior track surface 117 to prevent dislodgement of the sprocket 120 from the track 116.

Also depicted at FIG. 7 is a track tensioning bushing or washer 130 shown in dashed line that can be used to appropriately tension the idler wheels 18 relative to the track 116. The washer 130 has a lobe surface 132 that extends off-center from an aperture 133 that mounts to the ends of the axle 34. A projecting flange 135 at the surface 132 engages the rail 41, slot 38 or the bearing 19. Upon rotating the cam surface 132, the flange 135 extends or retracts relative the idler wheels 18 relative to the slot 38 to vary the track tension.

FIG. 8 depicts yet another sprocket 140. The sprocket 140 provides an injection molded sprocket ring 142 that mounts to a central hub and spoke plate (not shown) at apertures 141. The ring 142 can be molded from a suitable ultra high molecular weight plastic, polypropylene or nylon material (UHMW) or be cast or machined from aluminum or other suitable material. The hub/spoke plate is appropriately secured to a driven or passive axle that extends from the powered equipment. The hub/spoke plate is similarly fabricated from metal, a (UHMW) material or other suitable material to the application.

The sprocket 140 provides a central outer band surface 144 that extends around the circumference of the sprocket 140 and contacts the interior surface of a surrounding track 14. A series of inverted "U" shaped webbed ribs 146 transversely extend from the band 144 and define opposed left and right drive lug pockets 148 and 150. An interior rim band 151 having mounting apertures 141 couples to each of the inner ends of the ribs 146. Interior link pieces 153 extend between the ribs 146 at the lateral sides of the ring 151 and stabilize the lateral sides of the ribs 146 at the pockets 148 and 150.

Left and right longitudinal columns of drive lugs 20 that depend from a mating track 14 engage the drive lug pockets 148 and 150 to drive the track 14. If desired, the left and right pockets 148 and 150 can be circumferentially offset from each other and the left and right drive lugs 20 can correspondingly be longitudinally offset in the fashion of the track assembly 110.

The exposed lateral surfaces 152 of the webbed ribs 146 are shaped (e.g. flat or slightly tapered or vertically flared) to engage the inner surfaces of the adjoining idler wheels 16 and 18. The sprocket ring 142 is thus in continual contact with and constrained between the idler wheels 16 and 18. The sprocket support rollers 46 engage the band 144 and as with the other track assemblies 2 and 110, the rollers 46 rotate counter to the drive rotation of the sprocket 140.

Figure 11:
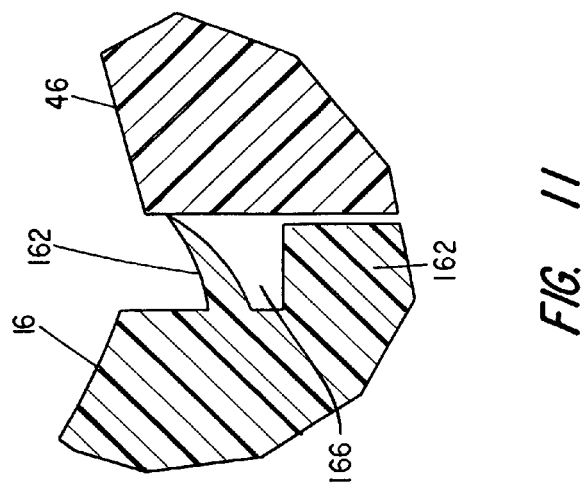
FIG. 11 shows an enlarged cross section view through one of the idler wheels in the region of contact between the integral, resilient seal and the adjacent sprocket support roller to expose the sealed joint between the idler wheel hub and support roller.
Figure 10:
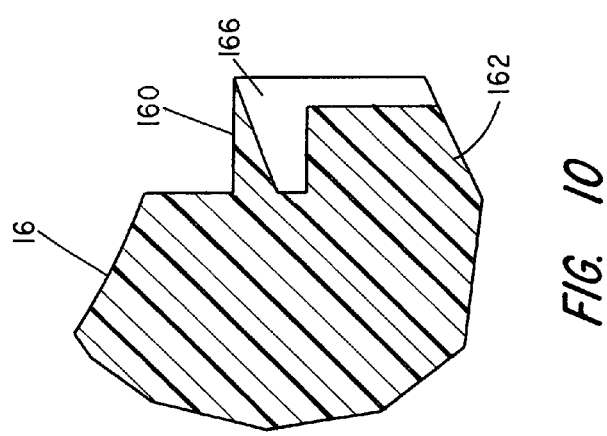
FIG. 10 shows an enlarged cross section view through one of the idler wheels in the region of the integral, resilient seal.
Figure 9:
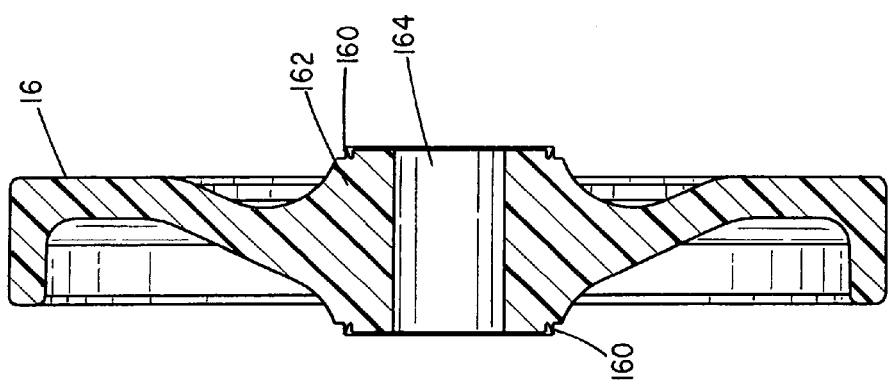
FIG. 9 shows a cross section view through one of the idler wheels to expose integral, resilient seals that concentrically project from one or both opposed faces of a center hub.

FIGS. 9 through 13 depict several views to alternative sealing structures that can be adapted between the idler wheels 16 and 18 and the sprocket support rollers 46. FIGS. 9 through 11 depict a representative one of the idler wheels 16 that has been constructed to include two integral, resilient seals 160. The seals 160 concentrically project from opposed surfaces of a center hub 162 and axle bore 164 of the idler wheel 16. Although two seals 160 are shown, a single seal 160 may only be included.

The seals 160 are offset to the outer periphery of the hub 162 via a groove or notched space 166. The seals 160 are presently constructed to exhibit a taper in the range of 5° to 15° which for the high density polypropylene material used at the idler wheel 16 assures a sufficient resilience and long seal life. The seals 160 extend beyond the hub 162 such that upon mounting the idler wheel 16 to an axle 32 the seal 162 compresses and flexes against the adjacent sprocket support roller 46. The resilient contact between the idler wheel 16 and roller 46 at the flexed seal 162 prevents dirt, snow and ice from collecting at the joint, see FIG. 11.

FIGS. 12 and 13 depict an alternative sealing structure that can be adapted between the idler wheels 16 and 18 and the sprocket support rollers 46. FIG. 12 depicts a representative one of the idler wheels 16 that has been constructed to include a recessed surface 170 that concentrically circumscribes the center hub 162 and axle bore 164 of the idler wheel 16.

The adjacent sprocket support roller 46 includes lip seals or flanges 172 that project from opposite surfaces of a hub 174. The lip seals 172 overlap the recesses 170 formed in the hubs 162 of the two adjoining idler wheels 16 and/or 18. A gap 176 on the order of 0.005 to 0.015 inches is provided between the idler wheel 16 and/or 18 and the roller 46. The gap 176 and configurations of the recesses 170 and lip seals 172 are formed to provide a wiping action at the protected joint rather than the flexible sealed joint obtained with the seals 160. Durable long-lived interaction is thus obtained with each of the foregoing joints between the idler wheels 16 and 18 and sprocket support rollers 46.

Figure 14:
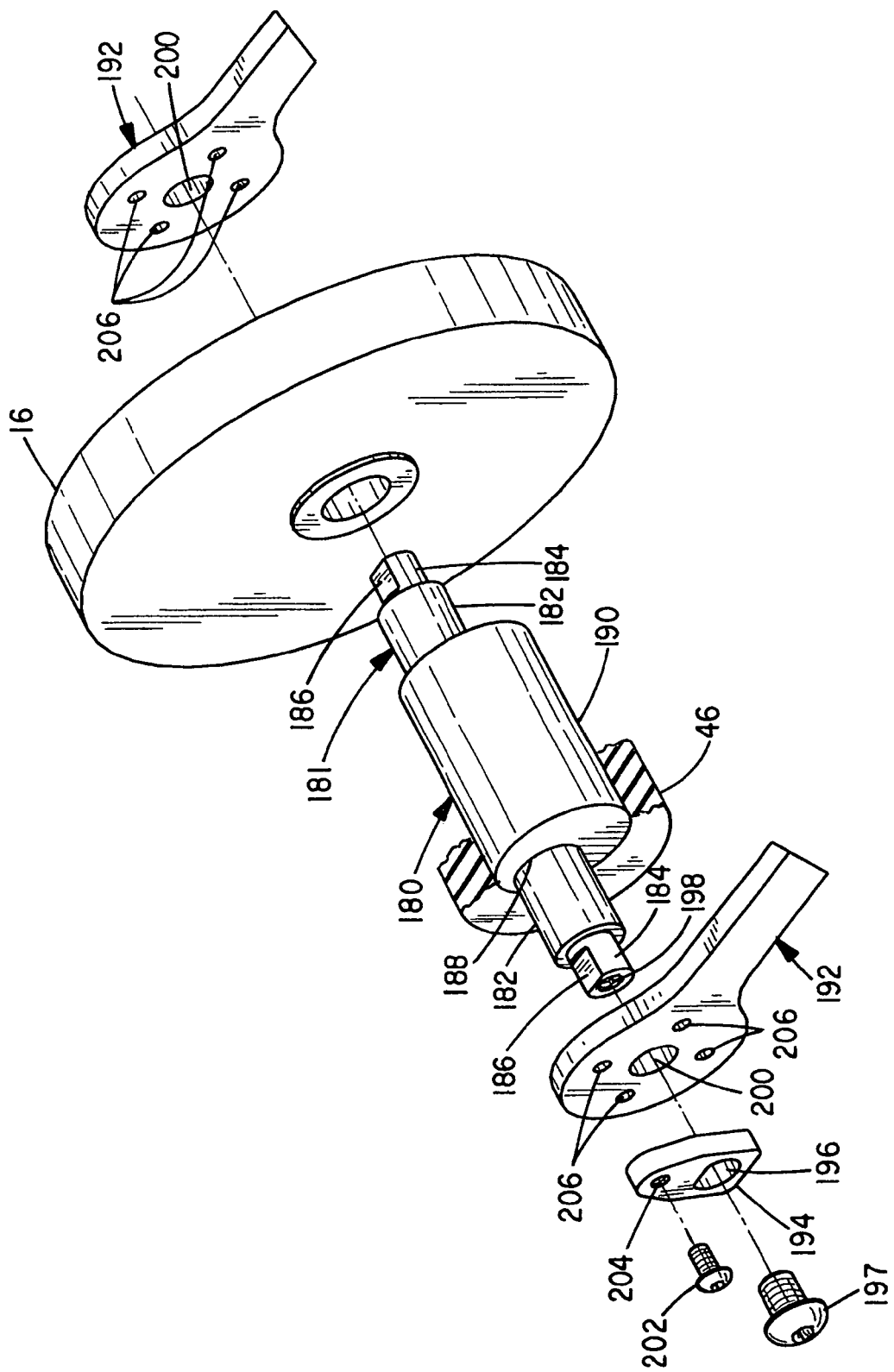
FIG. 14 shows a perspective view in partial exploded assembly to an alternative track tensioning arrangement wherein a sprocket support roller having an off-center axle bore is mounted to rotate about a supporting idler axle and selectively fasten to the stabilizer linkage arms to enable an eccentric tensioning of the sprocket relative to the drive track.

Depending upon the application, size of the track assembly 2 and/or stiffness of the track 14, the track tensioning assemblies discussed above may not provide sufficient adjustment. FIG. 14 accordingly depicts an alternative eccentric-type adjustment assembly 180 that can be adapted to the track assembly 2. The assembly 180 can be adapted to one or both of the fore and aft idler axles 32 and 34.

FIG. 14 particularly depicts a perspective view in partial exploded assembly and cutaway of a multi-section idler axle 181. Idler wheel support portions 182 extend from opposite ends of the axle 181 and include keyed ends 184 having exemplary flat surfaces 186. The ends 182 axially extend off-center from the lateral sides 188 of a center roller support portion 190. The longitudinal axis of the ends 182 extends in non-coaxial, parallel relation to the side of the longitudinal axis of the roller support portion 190. The sprocket support roller 46 shown in partial section mounts in concentric relation over the support portion 190. The idler wheel support portions 182 of the axle 181 are thereby extend off-center to the support portion 190 and the sprocket support roller 46. The sprocket support roller 46 can thereby be rotated in an eccentric fashion about the idler axle 181.

The idler wheels 16 mount in concentric relation to the axle ends 182 and the keyed ends 184 extend through left and right stabilizer linkage arms 192. A fastener plate 194 having an aperture 196 containing a flat surface shaped to mate with the axle surfaces 186 is secured with a fastener 197 (e.g. threaded bolt) to a bore 198 at the keyed ends 184. Upon rotating the fastener plate 194, the keyed axle ends 184 rotate within the bores 200 of the stabilizer arms 192 and the sprocket roller support portion 190 rotates the sprocket support roller 46 in an eccentric fashion against the associated track sprocket (e.g. sprockets 4, 120 or 140). The tension between the track sprocket 4, 120 or 140 is correspondingly varied with the track 14 as desired. Upon establishing a suitable tension, a fastener 202 is fitted through an aperture 204 at the fastener plate 194 and secured to one of several locking apertures 206 at the stabilizer linkage arm 192 to maintain the established tension.

Figure 15:
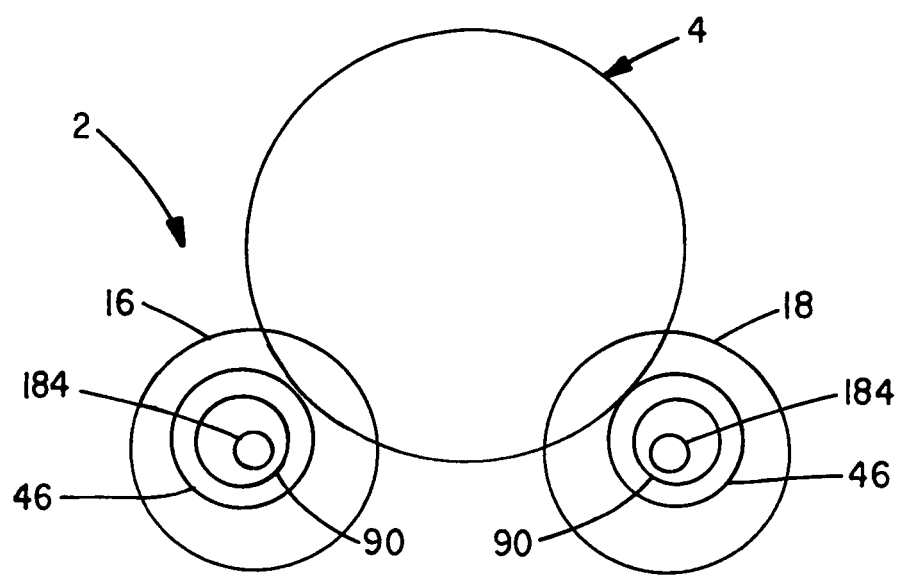
FIG. 15 shows a generalized plan view to a track assembly 2 adapted to include the off-center eccentric support rollers mounted in association to fore and aft idler wheels and the track sprocket.

FIG. 15 depicts a generalized plan view to a track assembly 2 adapted to include the off-center eccentric support roller assembly 180 at the fore and aft idler wheels 16 and 18. It is to be appreciated that one or more of the support roller assemblies 180 can be used as appropriate to the track assembly. It is also to be appreciated that the sprocket roller support portion 190 can be integrally formed with the axle 181 or can be separately keyed such as with a "woodruff key" and slot to the axle 181.

While the invention has been described with respect to a presently preferred assembly and considered improvements, modifications and/or alternatives thereto, still other assemblies and arrangements may be suggested to those skilled in the art. It is also to be appreciated that the features of the foregoing track assemblies can be arranged in different combinations. The foregoing description should therefore be construed to include all those embodiments within the spirit and scope of the following claims.

What is claimed is:

1. A track assembly comprising:
   a) a continuous track having drive lugs projecting from an interior surface and terrain engaging ground lugs projecting from an exterior surface;
   b) a sprocket comprising a hub piece including means for attaching to a vehicle and a cylindrical band mounted to circumscribe said hub piece, wherein said band includes a plurality of edge surfaces aligned to contact each of said drive lugs, and wherein said edge surfaces engage said drive lugs to rotate said track;
   c) a plurality of idler wheels mounted to first and second axles;
   d) a first roller mounted to one of said first and second axles to contact and support said sprocket and rotate about the one of said first and second axles; and
   e) first and second stabilizer arms respectively mounted adjacent laterally opposed longitudinal edges of said track and coupled to opposite ends of said first and second axles, wherein said sprocket is supported between said first and second stabilizer arms from said first roller and said track is trained around and in contact with said sprocket and idler wheels to rotate in endless fashion.

2. The track assembly as set forth in claim 1 including a second roller mounted to rotate about the other of said first and second axles in supporting contact with said sprocket.

3. The track assembly as set forth in claim 2 including means mounted to rotate at least one of said first and second rollers in eccentric relation to said first and second stabilizer arms to selectively direct the one of said first and second rollers and said sprocket to vary track tension between said sprocket and idler wheels.

4. The track assembly as set forth in claim 2 wherein said idler wheels include a seal member having a surface that circumferentially projects from a hub portion and contacts a surface of an adjoining one of said first and second rollers.

5. The track assembly as set forth in claim 1 wherein said edge surfaces of said band comprise a plurality of seriatim apertures.

6. The track assembly as set forth in claim 1 wherein said band includes a plurality of recesses let into opposite lateral edges of said band and wherein said recesses are aligned to engage said drive lugs and rotate said track.

7. The track assembly as set forth in claim 6 wherein the recesses along one lateral edge of said band are laterally displaced from the recesses along the opposite lateral edge of said band to capture first and second laterally displaced columns of drive lugs projecting from said track.

8. The track assembly as set forth in claim 7 wherein the recesses along one lateral edge of said band are circumferentially displaced from the recesses along the opposite lateral edge of said band and said first and second columns of drive lugs are correspondingly staggered at the interior surface of said track.

9. The track assembly as set forth in claim 1 wherein said stabilizer arms includes rails that longitudinally extend and laterally project to contact said drive lugs to prevent dislodgement of said track.

10. The track assembly vehicle as set forth in claim 9 wherein said stabilizer arms contact a bottom interior surface of said track.

11. The track assembly as set forth in claim 1 wherein one of said first and second axles includes coaxial opposite end portions and an intermediate portion having a longitudinal center axis that extends in displaced non-concentric parallel relation to the opposite coaxial end portions, wherein the one of said first and second rollers is mounted to rotate about the intermediate portion of the one of said first and second axles, and wherein the one of said first and second axles can be rotated at the first and second stabilizer arms to eccentrically direct the one of the first and second rollers to vary the tension of the track between said sprocket and idler wheels.

12. A track assembly comprising:
   a) a continuous track having drive lugs projecting from an interior surface and terrain engaging ground lugs projecting from an exterior surface;
   b) a sprocket comprising a hub piece including means for attaching to a vehicle and a cylindrical band mounted to circumscribe said hub piece, wherein said band includes a plurality of apertures aligned to engage said drive lugs to rotate said track;
   c) a plurality of idler wheels mounted to first and second axles;
   d) first and second rollers respectively mounted to rotate about said first and second axles and to contact and support said sprocket; and
   e) first and second stabilizer arms respectively mounted to support opposite ends of said first and second axles and wherein said track is trained around and in contact with said sprocket and idler wheels to rotate in endless fashion.

13. The track assembly as set forth in claim 12 wherein one of said first and second rollers is mounted to an intermediate portion of one of said first and second axles having a longitudinal axis that extends in displaced parallel non-concentric relation to a longitudinal axis of coaxial opposite end portions of the one of said first and second axles and including means for rotating the one of said first and second axles to direct the contact between the one of said first and second rollers and said sprocket to vary the track tension.

14. The track assembly as set forth in claim 12 wherein said band includes a plurality of recesses let into opposed lateral edge surfaces of said band, wherein said recesses are aligned to contact said drive lugs and wherein the recesses along one lateral band edge are circumferentially displaced from the recesses along the opposite lateral band edge of said sprocket to capture first and second columns of drive lugs at the interior surface of said track.

15. A track assembly comprising:
a) a continuous track having drive lugs projecting from an interior surface and ground lugs projecting from an exterior surface to engage a terrain;
b) a sprocket comprising a hub piece including means for attaching to a vehicle and a cylindrical band mounted to circumscribe said hub piece, wherein said band includes a plurality of surfaces aligned to contact a surface of each of said drive lugs, and wherein said surfaces capture said lugs and thereby said track to said sprocket;
c) first and second idler wheels respectively mounted to opposite coaxial end portions of first and second axles, wherein said sprocket is supported intermediate said first and second idler wheels, wherein one of said first and second axles includes a center portion having a longitudinal axis that extends in displaced non-concentric parallel relation to a longitudinal axis of the opposite coaxial end portions;
d) a first roller mounted to rotate about the center portion of the one of said first and second axles in contact with said sprocket; and
e) first and second stabilizer arms respectively mounted adjacent laterally opposed longitudinal edges of said track and to the opposite coaxial end portions of said first and second axles, wherein said track is trained around said sprocket and idler wheels to rotate in endless fashion, and wherein the one axle containing said first roller is mounted to rotate said first roller in eccentric relation to said first and second stabilizer arms to direct the contact between said first roller and said sprocket to vary the track tension with said sprocket and the first and second idler wheels of said first and second axles.

16. The track assembly as set forth in claim 15 wherein the opposite coaxial end portions of the one axle containing said first roller is keyed to selectively fasten to the first and second stabilizer arms.

17. The track assembly as set forth in claim 15 including a second roller, wherein the other of said first and second axles includes a center portion having a longitudinal center axis that extends in displaced non-concentric parallel relation to the opposite coaxial end portions of the other of said first and second axles, wherein the second roller is mounted to rotate about the center portion of the other of said first and second axles in contact with said sprocket, and wherein the opposite coaxial end portions of at least one of said first and second axles are keyed to selectively fasten to the first and second stabilizer arms.

* * * * *